Aug. 31, 1948.    G. L. HURST    2,448,373
APPARATUS FOR LOADING, STOWING
AND UNLOADING VESSELS
Filed June 2, 1944
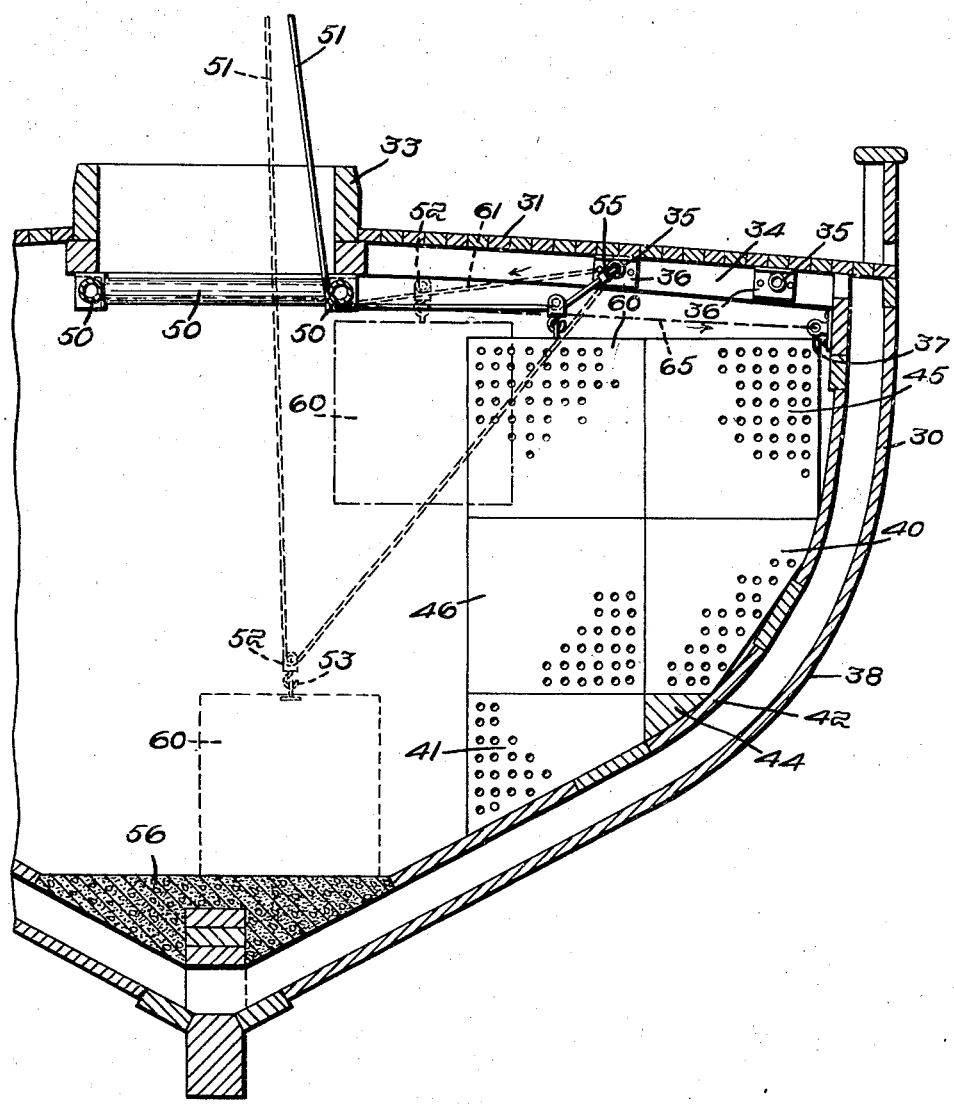
INVENTOR
Gilchrist L. Hurst
BY James R. Hodder
ATTORNEY Patented Aug. 31, 1948

2,448,373

UNITED STATES PATENT OFFICE 2,448,373

APPARATUS FOR LOADING, STOWING, AND UNLOADING VESSELS

Gilchrist L. Hurst, South Weymouth, Mass.

Application June 2, 1944, Serial No. 538,386

4 Claims. (Cl. 214—15)

My present invention is a novel and improved apparatus for handling, stowing, and unloading articles, packages, crates, containers, or the like in the holds of vessels, ships, or boats, particularly where such articles are to be handled thru a hatchway and under a vessel's deck.

In the stowing of goods or articles in the vessel's hold, it has heretofore been customary to lower such articles, particularly where heavy shipments are involved, by ropes and pulleys worked by winches thru a hatchway in the deck of a vessel; whereupon stevedores with trucks, rollers, crowbars, and the like manually move the articles underneath the decks, first stowing them in the wings or sides of the hold or portion adjacent the hatchway. Such work has heretofore involved a great deal of manual labor, particularly in getting heavy crates, articles, or packages stowed snugly underneath the deck.

My present invention is directed broadly to enable such stowing and unloading to be more quickly and efficiently performed than has heretofore been feasible, and, furthermore, I utilize novel means, gravity controlled, for stowing and removing underneath a deck or floor.

Various efforts have been made along this line, such as providing tracks secured underneath the deck along which traveling carriages or cranes could be manipulated, but all such prior devices have been impracticable, expensive, and utilized a large amount of headroom and, hence, a decrease in the stowage capacity of the vessel to which they were applied.

My present invention as above noted is directed primarily to the handling of fish and products, and a preferred embodiment of the invention for this specific purpose is illustrated in the drawings and will be described, although the broad idea of stowing, storing, and unloading is capable of wide and extensive use in the handling and stowing of any articles, as above noted.

Directing the invention to the handling of fish in vessels and stowing, storing, and unloading of the same, it has heretofore been customary to divide the holds of fishing vessels, schooners, draggers, and the like by a few rough partitions into a series of storage holds, into which fish or fish and ice were roughly piled and stowed. When one section or partitioned portion was filled, boards would then be laid over the top of same and additional fish piled on top.

It will be appreciated that in handling as delicate and easily spoiled food articles as fresh fish, the undue weight of masses of fish will result in crushing, damaging, and deteriorating the fish, with resultant spoilage thereof.

Also in unloading, it was customary to drop baskets down the hold and have fish forked into the same, which still further resulted in additional likelihood of damage and spoilage, as well as involving a vast amount of manual labor by such unloading operations. Therefore, as a part of my improved system for stowing and handling articles in vessels, I have devised a special collapsible container for fish storage, sorting, and handling which will enable a predetermined quantity, such as for example five hundred pounds, to be separately stored in each container and then the container itself handled in lowering into the hold, storing, stacking, and stowing the same and, thereafter, quickly unloading the container with the fish thus protected within the confines of each container. This not only protects the fish from damage, injury, crushing, forking, and spoilage but also greatly simplifies the task of unloading fish from the vessel's hold. It will be appreciated that fishing vessels are relatively small in size and without the arrangements, capacity, and equipment of cargo ships and, hence, it has heretofore been deemed impractical to have other means than hand-operated methods of handling and unloading fish from such smaller vessels.

In carrying out my invention either for handling fish containers or other articles to be stowed within a hold, I provide a series of eye-bolts or the like secured closely under the beams of the deck, or any one deck on the ship, which bolts are adapted to receive an end hook of the hoisting rope, preferably of wire, on which rope is a traveling pulley and hook. This same end hook, or the traveling pulley and hook, can be used to lower an article into the hold and then by shifting the end of the hoisting rope to an eye-bolt under the deck and with a guide pulley at each side of the hatchway thru which the hoisting rope operates, the tightening up of the hoisting rope will aid in swinging or sliding the article being handled to the sides of the hatch, and it can be then readily lowered and moved into final stowage position, as will be further explained. Also, by having an eye-bolt in the side walls lower than the guide pulley at the hatchway, the traveling pulley and its load can travel by gravity to the extreme wall and then be released and stowed.

Similarly, when unloading, the traveling pulley and hook can be utilized to lift the article to be unloaded from its nested berth and by my arrangement, wherein a deck eye-bolt is relatively above the position of the guide roller under the hatchway, the article thus hoisted on the traveling pulley would tend to travel or swing toward the hatchway and would be thereupon lowered to the bottom of the hold or to a support, the hook removed from the deck-bolt, and the article being handled then hoisted up thru the hatchway. All this will be further explained.

The figure is a diagrammatic view of a portion of the hold of a typical fishing vessel, illustrating the method of stowing and my system of loading and unloading.

Referring to the figure illustrating my novel handling system and apparatus therefor, I have illustrated in diagrammatic form a half-breadth portion of the hold of a vessel, having a hull 30 of typical design, with a deck 31 and a central open hatchway 33 thru which articles are lowered for stowing and hoisted for unloading. Secured to the deck beams 34 at appropriate spaces both sideways and in fore-and-aft direction are a plurality of eye-bolts 35 which may be secured in any suitable manner as by plates 36 attached to the side of the beams 34, or otherwise, which eyelets are strongly fitted to facilitate the stowing and unloading.

In the case of the design of a vessel, such as illustrated, with curved bilge portions 38, it is desirable to provide a series of non-nesting baskets designated at 40 and 41 either or both of which may have a special contour to fit snugly against the curved bilge portion of an inner ceiling or sheathing 42 of the vessel, and with or without shelves 44 to aid in snugly stowing these non-nesting sections.

Affixed to the lower part of the hatchway are a series of idle rolls 50, 50, suitably mounted in position, preferably below the deck beams 34 and, hence, at a relatively lower point than that of the bolts 35 to obtain the advantage of a gravity action during the unloading of the baskets, as will be explained. A hoisting rope or wire 51 led to a suitable pulley on a boom, mast, or support above the deck and, thence, to a supporting winch or tackle is provided with a sliding roller or pulley 52, carrying a hook 53, which hook is adapted to fit onto a sling, bolt, or the like on the load 60 to be handled.

When a container or article 60 is lowered thru the hatchway to the deck or a support, tension on the rope 51 is released and the end hook 55 is led to an eye-bolt 35 under the deck, see dotted line position, or to a side bolt 37 and with the hook 53 on the roller pulley attached to the load 60, thereupon, tension applied on the hoisting rope 51, the container load or article 60 will be lifted and automatically swung inwardly by the roller action of the pulley carrying the hook 53 to a position between the deck hook 55 and the hatchway roller 50. If the side bolt 37, which is below the hatchway roller is used, then the traveling pulley will carry the container clear into the side walls by gravity, as indicated in the dotted line 65.

Thus, by the simple continual hoisting on the rope 51, the container is swung and spotted into desired position by gravity travel, as indicated by the arrows; whereupon the hook 53 is released and the next load or container similarly handled.

When unloading, a substantial reverse operation is performed. The full-line position of the hoisting rope 51 being shown in the unloading operation, and when the hoisting strain is put upon the rope 51, the container shown for example as 60 is lifted slightly from its nested position; and because the hatchway roller 50 is below the deck beam hook 35, the entire container will tend to roll along the rope 51 as it assumes the dotted line position 60, thus moving the container outwardly into dotted line position as the roller 52 slides by gravity along the inclined, straightened, or partially straightened rope, as shown at 61. When unloading, the side eye bolts 37 would not be ordinarily used.

The length of the rollers 50 permit the hoisting rope to be led to a considerable range of deck pulleys 35 to effect the loading and unloading operation, as will be appreciated, and during unloading when the load or container 60 is swung free of its support, or the underneath container, it is lowered to the floor 56. Thereupon, the end hook 55 is released from the eye-bolt, the roller hook 53 disengaged from the hoisting bar, and the end hook 55 replaced therein; whereupon the container is hoisted up thru the hatchway and released. Or a separate hoisting pulley can be utilized while the roller hook is being led to another container for unloading. Or, if desired, the end hook 55 can be raised to a support above the hatchway and the container hoisted with the roller pulley 52 as a power tackle.

I wish to claim herein broadly my system of loading and unloading by the automatic swing or inclination of the articles being handled from a loading point inwardly toward or to the wall or tier to which the article is to be stowed by a gravity operation, as well as the lifting and unloading by the gravity operation of the simple operation of tightening the hoisting cable, as above explained.

I claim:

1. Ship construction comprising a hull having a hold for the stowage of articles, a deck, a hatchway thru the deck, a plurality of spaced fastening members fixed in predetermined position underneath said deck and remote from the hatchway, and roller members mounted in alignment with the hatchway and positioned below the level of said fastening members, in combination with cargo-handling hoisting cables, an article support freely movable along said cables said cables being adapted for attachment to the fixed fastening members and traveling over the roller members.

2. Ship construction comprising a hold for the stowage of articles, a deck, a hatchway thru the deck, anti-friction rollers mounted in alignment with the lower opening of the hatchway, a plurality of spaced fastening members fixed in predetermined position and spaced relationship remote from the hatchway in the deck and side walls of the ship's hold, in combination with a hoisting cable having a traveling pulley thereon adapted for carrying an article to be handled within the hold by gravity, whereby attachment of the end of said cable and the hoisting operation on said cable will automatically cause a gravity shifting operation of the pulley and the article carried into or out of stowage position underneath the deck.

3. Apparatus for lowering and hoisting articles thru a hatchway into a vessel to and from stowage position, comprising a vessel having a stowage hold covered by a deck, a hatchway thru said deck, a plurality of rollers in alignment with and below the sides of said hatchway, a plurality of anchor fastenings in predetermined positions under said deck and remote from the hatchway, and a hoisting cable having its free end adapted to engage a selective one of said anchor fastenings, said cable being provided with a freely slidable article-carrying device, said cable passing over one of the rollers at the hatchway when the free end of said cable is attached to one of said anchor fastenings, whereby the article-carrying device will be slidable by gravity on the cable between the roller and the anchor fastener during hoisting and lowering.

4. Apparatus for handling articles thru a hatchway in a vessel to and from stowage position remote from the hatchway, comprising a vessel having a stowage hold, a deck, a hatchway thru said deck, a plurality of rollers in alignment with and below the sides of the hatchway, a plurality of anchor fastenings in spaced relation remote from the hatchway, a hoisting cable with one end connected to a suitable source of power and the opposite end fitted to detachably engage one of said anchor fastenings, an article-carrying device freely slidable on the cable adapted to move an article carried by said device between the hatchway roller and the end attached to the anchor fastener.

GILCHRIST L. HURST.

REFERENCES CITED

The following references are of record in the file of this patent:

UNITED STATES PATENTS

| Number | Name | Date |
| --- | --- | --- |
| 84,794 | Brooks | Dec. 8, 1868 |
| 102,651 | Boothby | May 3, 1870 |
| 420,533 | Culbertson | Feb. 4, 1890 |
| 1,224,234 | Taber | May 1, 1917 |
| 1,939,037 | Bogert | Dec. 12, 1933 |
| 2,227,702 | Castleberry | Jan. 7, 1941 |
| 2,353,135 | Dorst | July 11, 1944 |

FOREIGN PATENTS

| Number | Country | Date |
| --- | --- | --- |
| 341,257 | Germany | Sept. 27, 1921 |